United States Patent
Coverstone et al.

(10) Patent No.: US 12,056,681 B2
(45) Date of Patent: *Aug. 6, 2024

(54) SECURE MOBILE CHECKOUT SYSTEM

(71) Applicant: American Express Travel Related Services Company, Inc., New York, NY (US)

(72) Inventors: Adam Forrest Coverstone, Gainesville, FL (US); August John Horvath, Coral Springs, FL (US); Sai Prajnay Mitta, Plantation, FL (US); Jyothi Mohan, Weston, FL (US); Veerababu Motamarri, Plantation, FL (US); Subhani Patthan, Plantation, FL (US); Marko Rodriguez, Delray Beach, FL (US); Jared Hale Trinkler, Weston, FL (US); Yan Yang, Coral Springs, FL (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,056

(22) Filed: Jun. 22, 2023

(65) Prior Publication Data

US 2023/0368175 A1 Nov. 16, 2023

Related U.S. Application Data

(63) Continuation of application No. 17/578,163, filed on Jan. 18, 2022, now Pat. No. 11,687,907, which is a
(Continued)

(51) Int. Cl.
*G06Q 20/20* (2012.01)
*G06Q 20/32* (2012.01)
*G06Q 20/40* (2012.01)

(52) U.S. Cl.
CPC ....... *G06Q 20/3227* (2013.01); *G06Q 20/208* (2013.01); *G06Q 20/3224* (2013.01); *G06Q 20/3278* (2013.01); *G06Q 20/401* (2013.01)

(58) Field of Classification Search
None
See application file for complete search history.

(56) References Cited

U.S. PATENT DOCUMENTS

| | | | |
|---|---|---|---|
| 10,360,597 B2 * | 7/2019 | Bruno | H04W 4/21 |
| 2012/0253852 A1 * | 10/2012 | Pourfallah | G06Q 20/327 |
| | | | 705/41 |

(Continued)

FOREIGN PATENT DOCUMENTS

| | | |
|---|---|---|
| KR | 1020070117048 A | 12/2007 |
| WO | 2014045145 A1 | 9/2012 |

(Continued)

OTHER PUBLICATIONS

Final Office Action dated Sep. 11, 2019 in U.S. Appl. No. 15/266,350.
(Continued)

*Primary Examiner* — Bruce I Ebersman
*Assistant Examiner* — Matthew Cobb
(74) *Attorney, Agent, or Firm* — Sterne, Kessler, Goldstein & Fox, P.L.L.C.

(57) ABSTRACT

Systems and methods for secure mobile checkouts are disclosed. The system may include a secure mobile checkout device configured to scan products available in a merchant store. The device may scan the product to determine a product identifier. The device may transmit the scanned product data to a checkout application to retrieve product data corresponding to the product identifier. In device may initiate a transaction with a payment network to purchase the product, based on the product data provided by the checkout
(Continued)

application. The payment network may process the transaction, and may authorize the purchase with the merchant.

12 Claims, 3 Drawing Sheets

Related U.S. Application Data continuation of application No. 16/161,812, filed on Oct. 16, 2018, now Pat. No. 11,250,411.

(56) References Cited

U.S. PATENT DOCUMENTS

| | | |
|---|---|---|
| 2013/0117087 A1 | 5/2013 | Coppinger |
| 2014/0125800 A1 | 5/2014 | Van Nest et al. |
| 2015/0134470 A1 | 4/2015 | Hejl et al. |
| 2015/0154850 A1 | 6/2015 | Fadell et al. |
| 2016/0292680 A1 | 10/2016 | Wilson, Jr. et al. |
| 2016/0342989 A1 | 11/2016 | Davis |
| 2016/0345978 A1 | 12/2016 | Cruise et al. |
| 2017/0046707 A1 | 2/2017 | Krause et al. |
| 2017/0048209 A1 | 2/2017 | Lohe et al. |
| 2017/0091740 A1 | 3/2017 | Enomoto et al. |
| 2017/0109735 A1 | 4/2017 | Sheng et al. |
| 2017/0230189 A1 | 8/2017 | Toll et al. |
| 2017/0232300 A1 | 8/2017 | Tran et al. |
| 2017/0372300 A1 | 12/2017 | Dunlevy et al. |
| 2018/0006826 A1 | 1/2018 | Smith et al. |
| 2018/0075453 A1 | 3/2018 | Durvasula et al. |
| 2018/0365952 A1* | 12/2018 | De Las Heras Villalon ............... G08B 13/246 |
| 2019/0147415 A1* | 5/2019 | Peikert ................. G06Q 20/405 705/64 |
| 2020/0118110 A1 | 4/2020 | Coverstone et al. |
| 2022/0138723 A1 | 5/2022 | Coverstone et al. |

FOREIGN PATENT DOCUMENTS

| | | | |
|---|---|---|---|
| WO | 2015121833 A1 | 2/2014 | |
| WO | WO-2015121833 A1 * | 8/2015 | ........... G06Q 20/354 |

OTHER PUBLICATIONS

International Search Report and Written Opinion PCT Serial No. PCT/US2019/022791 dated Jun. 6, 2019.

Restriction Office Action dated Aug. 6, 2019 in U.S. Appl. No. 15/405,123.

International Search Report and Written Opinion PCT Serial No. PCT/US2018/059670 dated Jan. 25, 2019.

Non-Final Office Action dated May 13, 2019 in U.S. Appl. No. 15/266,350.

International Search Report and Written Opinion of the International Searching Authority directed to related International Patent Application No. PCT/US2019/056450, dated Apr. 16, 2020; 9 pages.

* cited by examiner

SECURE MOBILE CHECKOUT SYSTEM

CROSS REFERENCE TO RELATED APPLICATIONS

This application is a continuation of U.S. application Ser. No. 17/578,163, filed Jan. 18, 2022 (now U.S. Pat. No. 11,687,907), which is a continuation of U.S. application Ser. No. 16/161,812, filed Oct. 16, 2018 (now U.S. Pat. No. 11,250,411), both of which are incorporated herein by reference in their entireties.

FIELD

This disclosure generally relates to product scanning devices, and more specifically, to a secure checkout system leveraging a mobile device having a product scanning application.

BACKGROUND

Users may desire to initiate transactions with a merchant using various methods. For example, a user may initiate a transaction with a merchant in person by visiting a brick and mortar store. Users may initiate and complete transactions in person by interacting with the merchant's point of sale system such as, for example, by swiping, inserting, or tapping a transaction instrument (e.g., via the transaction instrument's magnetic strip, embedded chip, near field communication (NFC), radio-frequency identification (RFID), etc.); by using a mobile device linked to a transaction account (e.g., via BLUETOOTH®, NFC, etc.); and/or the like. Typical merchant stores need users to stand in a checkout line and interact with a merchant teller to manually scan desired products to initiate the transaction. Merchant stores may also have users interact with a self-checkout or automated checkout system to manually scan desired products to initiate the transaction. As such, users may waste time standing in line to checkout. Moreover, typical manual checkout processes may be expensive for the merchant (e.g., cost of merchant teller salaries, point of sale (POS) systems, cash registers, product scanning systems, etc.).

A technical problem is that a merchant teller handling of transaction instruments or the use of NFC, BLUETOOTH® and similar transaction channels, may be unsecure, and may be susceptible to transaction account data being intercepted or misused by a third-party.

SUMMARY

Systems, methods, and articles of manufacture (collectively, the "system") for secure mobile checkouts are disclosed. The system may receive scanned product data comprising a product identifier associated with a product, and a merchant identifier. The system may retrieve product data based on the product identifier. The product data may comprise at least one of merchant-specific product data or available product data. The system may transmit a transaction data packet to a payment network to initiate a transaction. The transaction data packet may comprise the merchant identifier, the product identifier, the product price, and a user transaction account identifier. In response to receiving the transaction data packet, the payment network may be configured to process the transaction.

In various embodiments, the system may transmit a transaction approval to a secure checkout device in response to the payment network processing the transaction. The transaction approval may comprise a security device deactivation packet having a deactivation signal. In response to receiving the transaction approval the secure checkout device may be configured to transmit the deactivation signal to the product to deactivate a security device in the product. The secure checkout device may be configured to transmit the deactivation signal using at least one of near field communication (NFC), radio frequency identification (RFID), or Bluetooth.

In various embodiments, the merchant-specific data may be associated with the merchant identifier and comprise at least one of a product image, a product description, a product review, a product price, a product rebate, or a product discount. In various embodiments, the available product data may comprise a plurality of merchant identifiers each associated with at least one of a product image, a product description, a product review, a product price, a product rebate, or a product discount.

In various embodiments, a secure checkout device is disclosed. The secure checkout device may comprise a processor, a scanning module configured to receive instructions from the processor, and a tangible, non-transitory memory configured to communicate with the processor. The tangible, non-transitory memory may have instructions stored thereon that, in response to execution by the processor, cause the processor to perform operations comprising: scanning, by the processor and via the scanning module, a product to determine a product identifier, wherein the product is associated with a merchant identifier; retrieving, by the processor, product data based on the product identifier, wherein the product data comprises at least one of merchant-specific product data or available product data; and transmitting, by the processor, a transaction data packet to a payment network to initiate a transaction, wherein the transaction data packet comprises the merchant identifier, the product identifier, the product price, and a user transaction account identifier, and wherein in response to receiving the transaction data packet the payment network is configured to process the transaction.

In various embodiments, in response to processing the transaction, the payment network may be configured to generate a transaction authorization and transmit the transaction authorization to at least one of a merchant system associated with the merchant identifier or a transaction blockchain. In response to receiving the transaction authorization the merchant system may be configured to generate a transaction approval and transmit the transaction approval to the secure checkout device. In various embodiments, the secure checkout device may also comprise a communications chip in electronic communication with the processor. In response to receiving the transaction approval, the processor may be configured to instruct the communications chip to transmit a deactivation signal to the product to deactivate a security device in the product. The communications chip may comprise a near field communication (NFC) chip, a radio frequency identification (RFID) chip, or a Bluetooth chip.

In various embodiments, the secure checkout device may also comprise a global positioning system (GPS) in electronic communication with the processor. The processor may be configured to determine the merchant identifier based on geolocation data from the GPS. The transaction data packet may comprise a loyalty point redemption amount. The operation of scanning the product may comprise capturing at least one of a universal product code (UPC), a QR Code, or a barcode.

In various embodiments, the merchant-specific data may be associated with the merchant identifier and may comprise at least one of a product image, a product description, a product review, a product price, a product rebate, or a product discount. In various embodiments, the available product data may comprise a plurality of merchant identifiers each associated with at least one of a product image, a product description, a product review, a product price, a product rebate, or a product discount.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
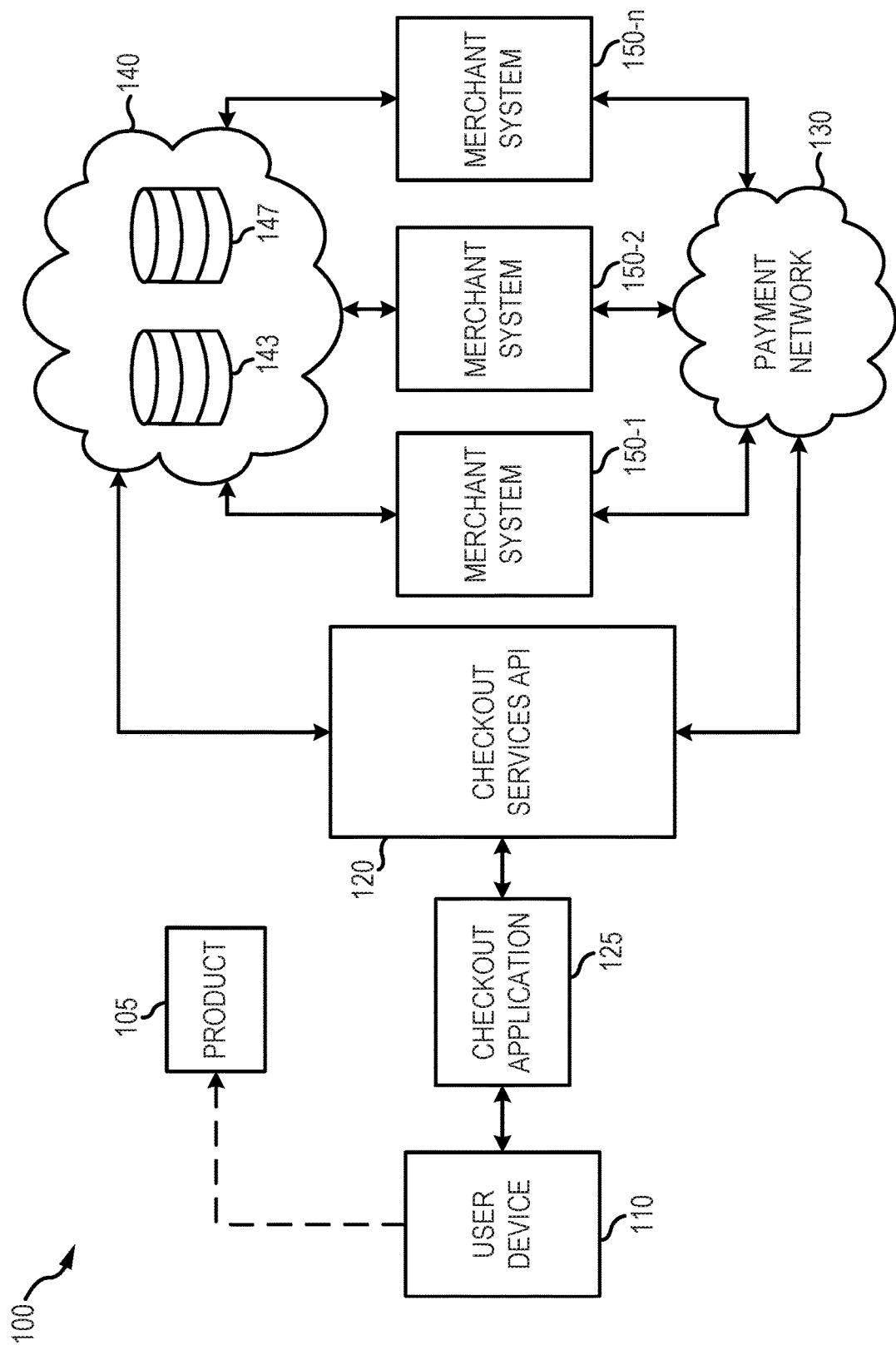
FIG. 1 is a block diagram illustrating various system components of a system for secure mobile checkouts, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment.

Although specific advantages have been enumerated herein, various embodiments may include some, none, or all of the enumerated advantages.

In various embodiments, systems for secure mobile checkouts are disclosed. The systems may enable users to scan products using a mobile device (e.g., a secure checkout device) to retrieve data regarding the product. The data may include, for example, a product price, a product price compare to other merchants, a personalized product offer based on geolocation data, a product manufacture rebate, a merchant rebate, a transaction account issuer rebate, and/or the like. The user may add the product to a virtual shopping cart and may continue to scan any additional number of desired products. The user may initiate a transaction via the mobile device to purchase the products. The user may pay for the products by using a transaction account or by using loyalty points (e.g., corresponding to the merchant or corresponding to the transaction account issuer). In response to the transaction being completed, the user may receive a digital receipt. The user may interact with the mobile device to deactivate a security tag present in one or more products. In that regard, the system may offer users a faster and more convenient checkout process, with the ability to price check and save money on product purchases. The user may also use the same mobile device and checkout application in a variety of merchant stores, without the checkout application needing to be merchant specific. Moreover, the system may reduce costs and increase efficiency for the merchant during the checkout process.

Therefore, the system may allow the merchant to conduct transactions without needing a point of sale system, merchant teller, self-checkout system, and the like. In that respect, the system may provide a technical solution to the technical problems presented in typical merchant stores. Thus, by transmitting, storing, and accessing data using the processes described herein, the security of the data is improved, which decreases the risk of the computer, network, or data from being compromised.

The system may use one or more distributed ledgers to store and maintain product data and/or transaction data. Each distributed ledger may be maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows and rules in a decentralized manner, and establish trust between the parties. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers (e.g., product data, transaction data, etc.) performed through the system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a Hyperledger® Fabric 1.0 based platform, the duration is driven by the specific consensus algorithm that is chosen, and may be performed within seconds. In that respect, propagation times and the speed of transferring data, initiating transactions, and completing the checkout process in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of product purchasing by performing cryptographic processes on data prior to storing the data on the blockchain. Therefore, by transmitting, storing, and accessing data using the system described herein, the security of the data is improved, which decreases the risk of the computer or network from being compromised. Moreover, use of blockchain technology may enable the issuer system to have access to product data and line items details that may improve the payment process.

In various embodiments, use of blockchain technology in the system may also reduce database synchronization errors by providing a common data structure, thus at least partially improving the integrity of stored data. Further, by syncing data with the involved parties in real time (or near real time), the system may improve data integrity, data confidentiality, and data security, which may also improve the speed of the business process. The system also offers increased reliability and fault tolerance over traditional databases (e.g., relational databases, distributed databases, etc.) as each node may operate with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, U.S. application Ser. No. 15/943,271 titled FRAUD MANAGEMENT USING A DISTRIBUTED DATABASE and filed on Apr. 2, 2018, U.S. application Ser. No. 15/948,834 titled REWARD POINT TRANSFERS USING BLOCKCHAIN and filed on Apr. 9, 2018, U.S. application Ser. No. 15/956,982 titled REWARD POINT REDEMPTION FOR CRYPTOCURRENCY and filed on Apr. 19, 2018, U.S. application Ser. No. 16/012,598 titled BUYER-CENTRIC MARKETPLACE USING BLOCKCHAIN and filed on Jun. 19, 2018, U.S. application Ser. No. 16/051,126 titled SYSTEM AND METHOD FOR TRANSACTION ACCOUNT BASED MICRO-PAYMENTS and filed on Jul. 31, 2018, and U.S. application Ser. No. 16/052,416 titled PROCUREMENT SYSTEM USING BLOCKCHAIN and filed on Aug. 1, 2018, the contents of which are each incorporated by reference in its entirety.

In various embodiments, and with reference to FIG. 1, a system 100 for secure mobile checkouts is disclosed. System 100 may comprise one or more of a user device 110, a checkout services API 120, a payment network 130, a data environment 140, and/or merchant systems 150 (e.g., merchant system 150-1, 150-2, 150-*n*). System 100 may also contemplate uses in association with web services, utility computing, pervasive and individualized computing, security and identity solutions, autonomic computing, cloud computing, commodity computing, mobility and wireless solutions, open source, biometrics, grid computing, and/or mesh computing.

In various embodiments, a user may desire to purchase one or more products 105 from a merchant brick and mortar store. The user may go to the merchant store to initiate the purchase of one or more products 105. The merchant store may correspond to merchant system 150-1, 150-2, or 150-*n* (e.g., a local branch/store or a merchant), as discussed further herein. Each product 105 may comprise a retail product or good sold at the merchant store. Product 105 may comprise a product UPC (universal product code), a QR Code®, a barcode, or the like corresponding to a product identification number. In various embodiments, product 105 may comprise a security device. The security device may be configured to aid in preventing (or reducing) theft of product 105, and may comprise, for example, an electromagnetic or magnetic strip, a radio frequency (RFID) security tag, a near field communication (NFC) security tag, a security label, a resonator tag, a "smart" security chip, and/or any other type of security device known in the art. The security device may be configured to be deactivated by user device 110 in response to a transaction being approved, as discussed further herein.

User device 110 may comprise any suitable hardware, software, and/or database or memory components capable of identifying one or more products 105, and transmitting, receiving, and/or storing data. User device 110 may comprise one or more computing devices, such as, for example a computer or processor, or a set of computers and/or processors, although other types of computing units or systems may also be used. For example, user device 110 may comprise a processor and one or more tangible, non-transitory memories capable of implementing logic. The processor may be configured to implement various logical operations in response to execution of instructions, for example, instructions stored on the non-transitory, tangible, computer-readable medium, as discussed further herein. User device 110 may comprise a laptop, tablet, handheld computer, personal digital assistant, cellular phone, smartphone (e.g., IPHONE®, BLACKBERRY®, and/or the like), IoT device, and/or the like. User device 110 may comprise an operating system, such as, for example, a WINDOWS® mobile operating system, an ANDROID® operating system, APPLE® IOS®, a BLACKBERRY® operating system, a LINUX® operating system, and the like.

Figure 2:
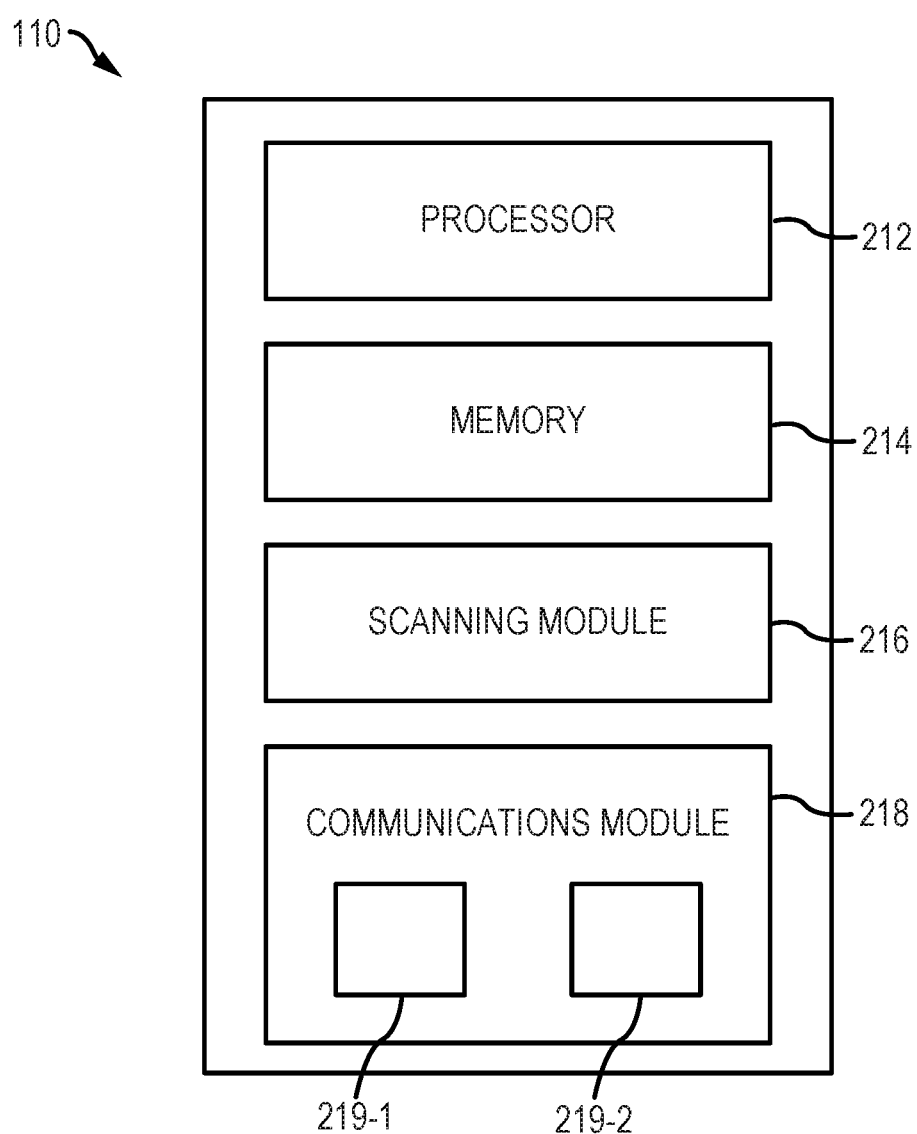
FIG. 2 is a block diagram illustrating various system components of an exemplary user device for use in a system for secure mobile checkouts, in accordance with various embodiments.

With reference to FIG. 2, an exemplary user device 110 is depicted, in accordance with various embodiments. User device 110 may comprise any suitable combination of hardware, software, and/or database or memory components. For example, user device 110 may comprise one or more of a processor 212, a memory 214, a scanning module 216, and/or a communications module 218.

Memory 214 may comprise any suitable database, data structure, memory component, or the like capable of storing data. For example, memory 214 may comprise any suitable tangible, non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like. Memory 214 may store, for example, data as instructed by processor 212, instructions usable by processor 212 to perform operations as described herein, or the like.

Scanning module 216 may comprise any hardware and/or software configured to enable user device 110 to identify product 105. For example, scanning module 216 may comprise one or more on-board cameras, webcams, or the like. In that respect, scanning module 216 may be configured to capture an image of a product UPC, a QR Code®, a barcode, or the like. Scanning module 216 may implement software configured to enable scanning module 216 to scan and detect a product UPC, a QR Code®, a barcode, or the like, such as any UPC, QR Code®, or barcode processing software known in the art. In various embodiments, scanning module 216 may also implement image recognition software or hardware configured to enable scanning module 216 to scan and detect products. For example, user device 110, via memory 214, may store pre-built models comprising unique product characteristics (e.g. dimensions, images, etc.), and scanning module 216 may compare a scanned image against the pre-built models to determine the product. In various embodiments, scanning module 216 may also implement machine learning techniques to aid in identifying the product image, such as, for example TENSORFLOW™.

Communications module 218 may comprise one or more hardware and/or software components capable of electronic communications and/or transmitting and receiving data. In various embodiments, communications module 218 may comprise a first communications chip 219-1, a second communications chip 219-2, and/or any other number of communications chips. First communications chip 219-1 may be configured to enable communications module 218, and user device 110, to communicate via a wired or wireless connection. For example, first communications chip 219-1 may comprise a modem, a network interface (such as an Ethernet card), a communications port, an 802.11 or 802.2(2) wireless chip, a BLUETOOTH® chip, a ZIGBEE® chip, and/or the like. Second communications chip 219-2 may be configured to enable communications module 218, and user device 110, to deactivate various security devices in one or more products 105, as described further herein. For example, second communications chip 219-2 may comprise a near field communication (NFC) chip, radio-frequency identification (RFID) chip, BLUETOOTH® chip, 802.11 or 802.2(2) wireless chip, or the like capable of transmitting signals to a security device to deactivate the security device. For example, second communications chip 219-2 may transmit a deactivation signal (e.g., a unique product signal and/or a unique merchant signal) that causes the security device to deactivate in response to receiving the signal.

Processor 212 may include any logic device such as, for example, one or more of a central processing unit (CPU), an accelerated processing unit (APU), a digital signal processor (DSP), a field programmable gate array (FPGA), an application specific integrated circuit (ASIC), or the like. Processor 212 may be configured to provide instructions to memory 214, scanning module 216, and/or communications module 218. Processor 212 may also be configured to perform various operations discussed herein, in response to executing instructions stored in memory 214. For example, processor 212 may instruct scanning module 216 to capture product 105 UPC, barcode, QR Code®, or the like, and may instruct communications module 218 to transmit and receive data, as discussed further herein. Processor 212 may also be configured to perform various crypto-operations, such as, for example, digitally signing and/or encrypting data transmission, decrypting received data transmissions, and/or the like.

With reference again to FIG. 1, and in accordance with various embodiments, user device 110 may also comprise software components installed on user device 110 and configured to allow user device 110 to access checkout application 125. For example, user device may access checkout application 125 to aid in identifying one or more products 105, interact with checkout services API 120 to view data corresponding to the identified products 105, initiate and complete transactions, and/or the like, as discussed further herein. User device 110 may comprise a web browser (e.g., MICROSOFT INTERNET EXPLORER®, GOOGLE CHROME®, etc.), an application, a micro-app or mobile application, or the like, configured to allow user device 110 to access and interact with checkout application 125.

In various embodiments, checkout application 125 may comprise software, a mobile application, a web interface, or the like accessible from user device 110. For example, checkout application 125 may include a graphical user interface ("GUI"), software modules, logic engines, various databases, and/or the like. In various embodiments, checkout application 125 may be in electronic communication with checkout services API 120. In various embodiments, checkout application 125 may be hosted by checkout services API 120 and/or payment network 130, and be in electronic communication with user device 110. Checkout application 125 may be configured to enable user device 110 to interact with checkout services API 120. For example, checkout application 125 may enable a user, via user device 110, to view data regarding one or more products 105, price compare one or more products 105, view deals related to one or more merchants and/or one or more products 105, initiate and complete transactions, and the like, as discussed further herein. Access to checkout application 125 may be controlled by the authorization of user credentials. For example, a user, via user device 110, may access checkout application 125 by inputting user credentials (e.g., a username, password, biometric input, etc.), and in response to checkout services API 120 authenticating the user credentials (e.g., by comparing the input user credentials to stored user credentials).

In various embodiments, checkout services API 120 may comprise a software interface configured to perform various operations and services in checkout process. In various embodiments, checkout services API 120 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein. Checkout services API 120 may be in electronic communication with checkout application 125, payment network 130, and/or data environment 140. In various embodiments, checkout services API 120 may be integrated into payment network 130. Checkout services API may be configured to perform various operations and services, retrieve and write data to product blockchain 143 and/or transaction blockchain 147, and initiate transactions with payment network 130, as discussed further herein.

In various embodiments, payment network 130 may be configured to receive transaction data packets, process and authorize the transaction data packets, and generate and transmit transaction authorizations to complete transactions, as discussed further herein. Payment network 130 may be in electronic communication with checkout services API 120, and one or more merchant systems 150-1, 150-2, 150-*n*. Payment network 130 may comprise any suitable combination of hardware, software, and/or database components. For example, payment network 130 may comprise one or more network environments, servers, computer-based systems, processors, databases, and/or the like. Payment network 130 may comprise at least one computing device in the form of a computer or processor, or a set of computers/processors, although other types of computing units or systems may be used, such as, for example, a server, web server, pooled servers, or the like. Payment network 130 may also include one or more data centers, cloud storages, or the like, and may include software, such as APIs, configured to perform various operations discussed herein. Payment network 130 may also include one or more blockchain nodes, APIs, SDKs, or the like configured to retrieve and write data to transaction blockchain 147. In various embodiments, payment network 130** may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, payment network 130 may comprise or interact with a traditional payment network or transaction network to facilitate purchases and payments, authorize transaction, settle transactions, and the like. For example, payment network 130 may represent existing proprietary networks that presently accommodate transactions for credit cards, debit cards, and/or other types of transaction accounts or transaction instruments. Payment network 130 may be a closed network that is secure from eavesdroppers. In various embodiments, payment network 130 may comprise an exemplary transaction network such as AMERICAN EXPRESS®, VISANET®, MASTER-CARD®, DISCOVER®, INTERAC®, Cartes Bancaires, JCB®, private networks (e.g., department store networks), and/or any other payment network, transaction network, or the like. Payment network 130 may include systems and databases related to financial and/or transactional systems and processes, such as, for example, one or more authorization engines, authentication engines and databases, settlement engines and databases, accounts receivable systems and databases, accounts payable systems and databases, and/or the like. In various embodiments, payment network may also comprise a transaction account issuer's Credit Authorization System ("CAS") capable of authorizing transactions, as discussed further herein. Payment network 130 may be configured to authorize and settle transactions, and maintain transaction account member databases, accounts receivable databases, accounts payable databases, or the like.

Although the present disclosure makes reference to payment network 130, it should be understood that principles of the present disclosure may be applied to a system for secure mobile checkouts having any suitable number of payment networks. For example, system 100 may comprise one or more payment networks 130 each corresponding to or associated with a different issuer system or network.

In various embodiments, data environment 140 may be in electronic communication with checkout services API 120, payment network 130, and/or one or more merchant systems 150. Data environment 140 may be configured to host, store, and/or maintain a product blockchain 143 and/or a transaction blockchain 147. For example, data environment 140 may comprise one or more blockchain networks. For example, data environment 140 may comprise a single blockchain network configured to provide access to product blockchain 143 or transaction blockchain 147, or may comprise a plurality of blockchain networks configured to provide access to product blockchain 143 and/or transaction blockchain 147. In that respect, data environment 140 may be a blockchain network or peer-to-peer network that is private, consortium and/or public in nature (e.g., ETHEREUM®, HYPERLEDGER® Fabric, etc.). Consortium and private networks may offer improved control over the content of the blockchain and public networks may leverage the cumulative computing power of the network to improve security.

In various embodiments, data environment 140 may comprise one or more blockchain nodes configured to maintain copies of product blockchain 143 and/or transaction blockchain 147, write and/or retrieve data and blocks from product blockchain 143 and/or transaction blockchain 147, validate blocks written to product blockchain 143 and/or transaction blockchain 147, and/or propagate writes to product blockchain 143 and/or transaction blockchain 147 across data environment 140. Each blockchain node may be interconnected with one or more other blockchain nodes (e.g., a merchant blockchain node, a payment network blockchain node, a checkout services blockchain node, etc.), and may communicate across blockchain nodes to validate and write blocks to product blockchain 143 and/or transaction blockchain 147, and to establish consensus between the blockchain nodes based on proof of work, proof of stake, practical byzantine fault tolerance, delegated proof of stake, or other suitable consensus algorithms. Each blockchain node may comprise one or more computing devices, such as, for example a computer or processor, or a set of computers, processor, and/or application specific integrated circuits (ASICs), although other types of computing units or system may also be used.

In various embodiments, product blockchain 143 and/or transaction blockchain 147 may be a distributed ledger that maintains records in a readable manner and that is resistant to tampering. Product blockchain 143 and transaction blockchain 147 may be maintained as a single distributed ledger, or as two separate distributed ledgers. Product blockchain 143 and/or transaction blockchain 147 may be based on blockchain technologies such as, for example, ETHEREUM®, Open Chain, Chain Open Standard, Hyperledger® Fabric, CORDA CONNECT®, INTEL® Sawtooth™, etc. Product blockchain 143 and/or transaction blockchain 147 may comprise a ledger of interconnected blocks containing data. Each block may link to the previous block and may include a timestamp. For example, blocks in product blockchain 143 may hold product data such as a product price, a product description, a product review, a product image, a product discount or rebate, or the like. The blocks in product blockchain 143 may also comprise a merchant identifier corresponding to the product data, such that product data regarding products 105 for sale at a specified merchant store may be retrieved based on the merchant identifier. In that regard, and in accordance with various embodiments, product blockchain 143 may comprise product data for all merchant systems 150 in system 100.

As a further example, blocks in transaction blockchain 147 may hold transaction data such as transaction data packets, transaction authorizations, transaction approvals, and the like. When implemented in support of system 100, transaction blockchain 147 may serve as an immutable log of transactions in system 100. Product blockchain 143 and/or transaction blockchain 147 may be maintained on various blockchain nodes in the form of copies or partial copies of the product blockchain and/or transaction blockchain, as discussed further herein. Blocks may be written to product blockchain 143 and/or transaction blockchain 147 by establishing consensus between the blockchain nodes based on proof of work, proof of stake, practical byzantine fault tolerance, delegated proof of stake, or other suitable consensus algorithms.

In various embodiments, system 100 may comprise one or more merchant systems 150. For example, system 100 may comprise a first merchant system 150-1, a second merchant system 150-2, an "Nth" merchant system 150-n, and/or the like (collectively, "merchant systems 150"). Each merchant system 150 may be in electronic communication with payment network 130 and/or data environment 140. Each merchant system 150-1, 150-2, 150-n may be associated with one or more merchant brick and mortar stores. Each merchant store may host one or more products 105 for purchase by a user. In that respect, each merchant system 150 may store and maintain product data in product blockchain 143 based on the products 105 available at one or more associated merchant stores, as discussed further herein. Each merchant system 150 may comprise any suitable combination of hardware, software, and/or database components. For example, merchant systems 150 may each comprise one or more network environments, servers, computer-based systems, processors, databases, datacenters, and/or the like.

One or more merchant systems 150 may also include one or more blockchain nodes, APIs, SDKs, or the like configured to retrieve and write data to product blockchain 143 and/or transaction blockchain 147. For example, each merchant system 150 may update product blockchain 143 with currently available products 105, including product prices, product descriptions, product reviews, product images, product discounts or rebates, or the like. Each merchant system 150 may also update transaction blockchain 147 to store and track transaction approvals, and/or any other transaction data. In various embodiments, one or more merchant systems 150 may be computer based, and may comprise a processor, a tangible non-transitory computer-readable memory, and/or a network interface, along with other suitable system software and hardware components. Instructions stored on the tangible non-transitory memory may allow one or more merchant systems 150 to perform various functions, as described herein.

As used herein, "transmit" may include sending at least a portion of electronic data from one system component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system 100 components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system 100 components may be in electronic communication via a network. As used herein, the term "network" may further include any cloud, cloud computing system, or electronic communications system or method that incorporates hardware and/or software components. Communication amongst the nodes may be accomplished through any suitable communication channels, such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system 100 may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

Figure 3:
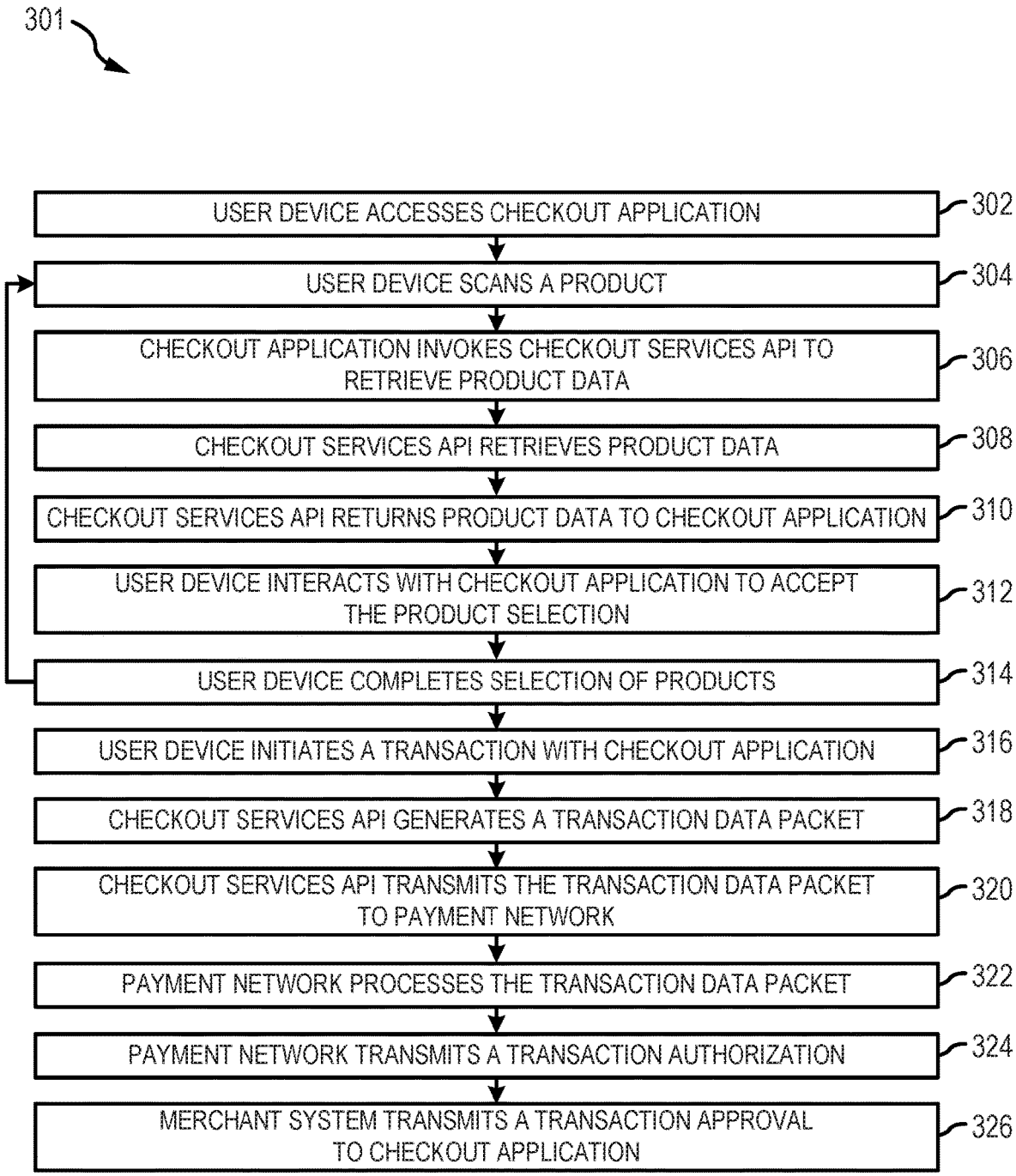
FIG. 3 illustrates a process flow for a method of secure mobile checkouts, in accordance with various embodiments.

Referring now to FIG. 3 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIG. 3, but also to the various system components as described above with reference to FIGS. 1 and 2. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

In various embodiments, a method 301 for secure mobile checkouts is disclosed. A user may desire to purchase one or more products 105 from a merchant brick and mortar store. The user may go to the merchant store to initiate the purchase of one or more products 105 using method 301. The merchant store may be affiliated with merchant system 150-1, 150-2, or 150-$n$ (e.g., a local branch/store or a merchant).

User device 110 accesses checkout application 125 (step 302). Access to checkout application 125 may be controlled for security. For example, checkout application 125 may prompt user device 110 to input user credentials to access checkout application 125, such as a username and password, biometric input, or the like. In response to receiving the user credentials input, checkout application 125 may invoke checkout services API 120 (by passing the user credentials input) to authorize access (e.g., based on a comparison to stored credentials, or the like). In response to user device 110 accessing checkout application 125, checkout application 125 may display various transaction options and data to user device 110. For example, checkout application may display transaction history (e.g., transaction details, electronic receipts, etc.), transaction account data (e.g., account balances, account debits, loyalty point balances, upsell opportunities, etc.), personal product offers, or the like.

In various embodiments, checkout application 125 may interact with one or more hardware and/or software components of user device 110. For example, checkout application 125 may interact with the global positioning system (GPS) unit (or similar location-based services) of user device 110 to determine the merchant store from which the user is desiring to purchase a product 105. For example, checkout application 125 may store and maintain location-based data corresponding to one or more merchant stores associated with a merchant system 150-1, 150-2, or 150-$n$. In that regard, checkout application 125 may determine the merchant store (based on geolocation) that user device 110 is within the boundary of, and the merchant identifier associated with the merchant store. Based on the determined merchant store, checkout application 125 may retrieve product discount data associated with the determined merchant store. The product discount data may comprise data regarding one or more product 105 rebates, discounts, or the like. For example, checkout application 125, via checkout services API 120 may query product blockchain 143 to retrieve the product discount data (based on the merchant identifier). As a further example, checkout application 125 may query locally-stored product discount data from checkout services API 120 (based on the merchant identifier). The product discount data may be supplemented or updated based on a user profile, a time period, holidays, etc. Checkout application 125 may display to user device 110 one or more product discount data.

Checkout application 125 may also display a product scanning option. In response to user device 110 selecting the product scanning option, checkout application 125 may interact with scanning module 216 of user device 110 to enable user device 110 to scan one or more products 105. User device 110 scans product 105 (step 304), and transmits scanned product data to checkout application 125. For example, user device 110 may scan product 105 by capturing a product UPC (universal product code), a QR Code®, a barcode, reading a product label, recognizing the shape of a product, recognizing the size of a product (e.g., large milk carton v. small milk carton) or the like. User device 110 may generate scanned product data based on the captured data. User device 110 may transmit the scanned product data to checkout application 125. In response to receiving the scanned product data, checkout application 125 may be configured to convert the scanned product data into a product identification number using any suitable barcode or QR Code® processing technique known in the art. For example, checkout application 125 may implement optical character recognition (OCR), or any other software configured to decipher the scanned product data into the product identification number.

Checkout application 125 invokes checkout services API 120 to retrieve product data (step 306). Checkout application 125 may invoke checkout services API 120 by transmitting the product identification number to checkout services API 120. In response to being invoked, checkout services API 120 retrieves product data (step 308). The product data may comprise merchant-specific product data and/or available product data. The merchant-specific product data may comprise data regarding product 105 that is dependent on the identified merchant system 150, such as, for example, a product image, a product description, a product review, a product price, a product rebate, or the like, as offered at the corresponding merchant store. The available product data may comprise data regarding product 105 that is not dependent on the identified merchant system 150. For example, the available product data may comprise data such as a product image, a product description, a product review, a product price, a product rebate, or the like, for each merchant system 150-1, 150-2, 150-*n* in system 100 (e.g., "merchant store A" sells product X for $50.00, "merchant store B" sells product X for $48.00, etc.). In that respect, the available product data may be used for price comparison, or for any other desired need.

Checkout services API 120 may retrieve the product data from one or more sources using any suitable technique. For example, and in accordance with various embodiments, checkout services API 120 may query product blockchain 143 to retrieve the product data. Checkout services API 120 may query product blockchain 143 based on the product identification number and the merchant identifier. For example, checkout services API 120 may be configured to query product blockchain 143 using a blockchain node (e.g., a checkout services blockchain node) in electronic communication with data environment 140 (e.g., the blockchain network). The blockchain node may comprise a full or partial copy of product blockchain 143. Checkout services API 120 may also be configured to query product blockchain 143 using an API, SDK, or the like capable of interacting with a blockchain node to retrieve the product data from product blockchain 143. As a further example, and in accordance with various embodiments, checkout services API 120 may query one or more local product databases to retrieve the product data. For example, checkout services API 120 may store and maintain local product data to increase speed and efficiency of retrieving product data. In that respect, checkout services API 120 may be configured to update the locally stored product data by querying product blockchain 143 at a defined interval (e.g., 10 minutes, 1 hour, 12 hours, etc.).

In response to retrieving the product data, checkout services API 120 returns the product data to checkout application 125 (step 310). Checkout application 125 may display one or more elements of the product data to user device 110. For example, checkout application 125 may display merchant-specific product data, such as the product image and product price associated with the scanned product 105, and/or one or more product offers (e.g., rebates, discounts, etc.) for the scanned product 105. As a further example, in response to user device 110 accessing a price compare option, checkout application 125 may display available product data, such as the product price at one or more merchant stores. For example, and in accordance with various embodiments, merchant-specific stock keeping unit (SKU) data corresponding to each UPC may be tracked and maintained across various merchants, and the merchant-specific SKU data may be retrieved based on the product data to display via checkout application 125 available product data across various merchants. In various embodiments, checkout application 125 may also implement machine learning, API's, or the like configured to locate related and/or recommended products based on scanned product 105.

User device 110 interacts with checkout application 125 to accept product 105 selection (step 312). For example, user device 110 may interact with checkout application 125 to select one or more product offers, to price compare product prices at one or more merchant stores, or the like. User device 110 may also interact with checkout application 125 to add product 105 to the user's shopping cart, and/or to remove product 105 from the user's shopping cart.

In various embodiments, user device 110 completes selection of products 105 (step 314). In that respect, step 304 to step 312 may be repeated as desired by the user to scan and add additional product 105 to the user's shopping cart.

User device 110 initiates a transaction with checkout application 125 (step 316). For example, in response to user device 110 completing selection of products 105, the user may select to checkout and purchase the products 105. In various embodiments, checkout application 125 may also prompt user device to select a method of payment, such as, for example, a transaction account, a gift card, transaction account loyalty points, or the like (as a full or partial payment method).

Checkout application 125 generates a transaction data packet (step 318) and transmits the transaction data packet to payment network 130 (step 320). The transaction data packet may comprise the merchant identifier corresponding to the merchant store, a transaction account number corresponding to the user accessing checkout application 125 (e.g., based on the user previously supplying user credentials), loyalty points amount (e.g., partial or full payment using loyalty points) a transaction total, the product data for each product 105 being purchased, and/or any other suitable transaction data. Checkout application 125 transmits the transaction data packet to payment network 130, via checkout services API 120. In various embodiments, checkout services API 120 may also write the transaction data packet to transaction blockchain 147. In that respect, checkout services API 120 may interact with a blockchain node to write the transaction data packet to a local copy of transaction blockchain 147. Checkout services API 120 may comprise a dedicated blockchain node (e.g., the checkout services blockchain node), or may interact with a blockchain node via an API, SDK, or the like. The blockchain node may broadcast the write to at least a second blockchain node in data environment 140 (e.g., the blockchain network) to propagate the write.

Payment network 130 processes the transaction data packet (step 322) to authorize the transaction. Payment network 130 may process, authorize, and settle the transaction request using any suitable method. For example, payment network 130 may perform an authorization process to ensure that the transaction account provided by the user has the necessary funds to complete the transaction, based on the transaction total. In various embodiments, payment network 130 may also begin the process of transferring funds from the user's transaction account to a transaction account associated with the merchant identifier, deducting redeemed loyalty points, and the like.

In response to completing processing the transaction data packet, or partially completing at least authorization of the transaction data packet, payment network 130 transmits a transaction authorization (step 324). The transaction authorization may comprise data indicating that the transaction account associated with the user was successfully charged or debited, based on the transaction data packet, and/or that the transaction was authorized by payment network 130. Payment network 130 may transmit the transaction authorization using any suitable technique. For example, and in accordance with various embodiments, payment network 130 may transmit the transaction authorization to be written to transaction blockchain 147. In that respect, payment network 130 may interact with a blockchain node to write the transaction authorization to a local copy of transaction blockchain 147. Payment network 130 may comprise a dedicated blockchain node (e.g., a payment network blockchain node), or may interact with a blockchain node via an API, SDK, or the like. The blockchain node may broadcast the write to at least a second blockchain node in data environment 140 (e.g., the blockchain network) to propagate the write. The corresponding merchant system 150-1, 150-2, or 150-n may be configured to retrieve the transaction authorization using a blockchain node (e.g., a merchant system blockchain node), a blockchain oracle, an API, a SDK, or the like. As a further example, and in accordance with various embodiments, payment network 130 may directly transmit the transaction authorization to the corresponding merchant system 150-1, 150-2, or 150-n.

In various embodiments, merchant system 150 transmits transaction approval to checkout application 125 (step 326) via checkout services API 120. For example, in response to receiving the transaction authorization, merchant system 150 may approve the transaction and may generate the transaction approval. The transaction approval may comprise an electronic receipt of the transaction (e.g., detailing the purchased products, product prices, total transaction cost, etc.). In that regard, the transaction approval may be transmitted via email, text message (e.g., SMS, MMS), as a push notification, or the like. The transaction approval may also be displayed to user device 110 via checkout application 125. Checkout services API 120 may be configured to store the transaction approval in a local transaction database. Checkout services API 120 (or merchant system 150) may also be configured to write the transaction approval to transaction blockchain 147, using a blockchain node, API, SDK, or the like. In response to receiving the transaction approval, the user may leave the merchant store with the purchased products 105.

In various embodiments, the transaction approval may also be transmitted to the merchant store, such that the merchant store may deactivate its exit security system to allow the user to bring the goods out of the store without setting off the exit alarm. In various embodiments, the transaction approval may also comprise an exit signal such that user device 110 may be configured to provide the exit signal upon exiting the merchant store, to allow the user to bring the products 105 out of the merchant store. The exit signal may comprise data indicating the selected products 105 to be allowed to exit the store without setting off the exit alarm, such as, for example, based on UPC, merchant-specific SKU data, or the like.

In various embodiments, the transaction approval may also comprise data and/or instructions to disable one or more security devices in one or more of the purchased products 105 (e.g., a security deactivation data packet). For example, in response to receiving the security deactivation data packet, user device 110 may instruct the user to position user device 110 proximate a selected product 105. In response to positioning user device 110, the user may interact with user device 110 to deactivate the security device. For example, user device 110, via communications module 218 (e.g., second communications chip 219-2), may transmit a deactivation signal via NFC, RFID, or the like. In various embodiments, the deactivation signals may be unique for each security device and/or selected product 105. The corresponding deactivation signal may be retrieved based on UPC data, merchant-specific SKU data, or the like. Data regarding he deactivation signal may be stored in product blockchain 143 and retrieved during the transaction, as previously discussed. The deactivation signal may comprise instructions to deactivate the security device of a given product 105. In response to the security device receiving the deactivation signal, the security device may deactivate. User device 110 may detect the deactivation, and may prompt the user that the security device was deactivated.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The phrases "user," "transaction account holder," "transaction account beneficiary," "transaction account affiliate," "consumer," "customer," "cardmember," or the like shall include any person, entity, business, government organization, business, software, hardware, or machine associated with a transaction account, who buys merchant offerings offered by one or more merchants using the transaction account, and/or who is legally designated for performing transactions on the transaction account, regardless of whether a physical card is associated with the transaction account. For example, the user may include a transaction account owner, a transaction account user, an account affiliate, a child account user, a subsidiary account user, a beneficiary of an account, a custodian of an account, and/or any other person or entity affiliated or associated with the transaction account.

Phrases and terms similar to "transaction account," "account number," "account code", or "consumer account" as used herein, may include any device, code (e.g., one or more of an authorization/access code, personal identification number ("PIN"), internet code, other identification code, and/or the like), number, letter, symbol, digital certificate, smart chip, digital signal, analog signal, biometric, or other identifier/indicia suitably configured to allow the consumer to access, interact with or communicate with the system. The transaction account number may optionally be located on or associated with a rewards account, charge account, credit account, debit account, prepaid account, telephone card, embossed card, smart card, magnetic stripe card, bar code card, transponder, radio frequency card, or an associated account.

The transaction account number may be distributed and stored in any form of plastic, electronic, magnetic, radio frequency, wireless, audio, and/or optical device capable of transmitting or downloading data from itself to a second device. The transaction account number may be, for example, a sixteen-digit account number, although each transaction account issuer has its own numbering system, such as the fifteen-digit numbering system used by the AMERICAN EXPRESS® company. In that respect, each of the transaction account issuer's transaction account numbers may comply with that transaction account issuer's standardized format, such that the transaction account issuer using a fifteen-digit format will generally use three-spaced sets of numbers, as represented by the number "0000 000000 00000." The first five to seven digits may be reserved for processing purposes and identify the transaction account issuer, account type, etc. In this example, the last (fifteenth) digit is used as a sum check for the fifteen digit number, and the intermediary eight-to-eleven digits are used to uniquely identify the user. A merchant identifier may be, for example, any number or alpha-numeric characters that identify a particular merchant for purposes of account acceptance, account reconciliation, reporting, or the like.

Phrases and terms similar to "financial institution" or "transaction account issuer" may include any entity that offers transaction account services. Although often referred to as a "financial institution," the financial institution may represent any type of bank, lender, or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "merchant," "business," "seller," or "supplier" may be used interchangeably with each other and shall mean any person, entity, distributor system, software, and/or hardware that is a provider, broker, and/or any other entity in the distribution chain of goods or services. For example, a merchant may be a grocery store, a retail store, a travel agency, a service provider, an on-line merchant, or the like. The merchant may request payment for goods (e.g., product 105) or services sold to the user who holds a transaction account with a transaction account issuer.

In various embodiments, the user device 110 may integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can assist with tasks, entertainment, general information, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOME® system, and HOMEPOD® system may receive voice commands via its voice activation technology, activate other functions, control smart devices, and/or gather information. For example, the smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news. The ALEXA®, GOOGLE HOME®, and HOMEPOD® systems may also allow the user to access information about eligible transaction accounts linked to an online account across all digital assistant-enabled devices.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, a Personal Computer Memory Card International Association (PCMCIA) slot and card, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "ebook," an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

In various embodiments, components, modules, and/or engines of system 100 may be implemented as microapplications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, NY) is an example of a commercially available middleware product. An Enterprise Service Bus ("ESB") application is another example of middleware.

The systems, computers, computer based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. As a further example, representational state transfer (REST), or RESTful, web services may provide one way of enabling interoperability between applications.

In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

Users, systems, computer based systems or the like may communicate with the server via a web client. The web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any database, data structure, or the like discussed herein may include relational, hierarchical, graphical, blockchain, object-oriented structure, and/or any other database configurations. Any database, data structure, or the like may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPE"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art, and are covered in many standard texts.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multi-threaded Machine ("PM2"); a resource and performance monitoring tool, such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

The disclosure and claims do not describe only a particular outcome of checkouts in merchant stores using a secure mobile checkout system, but the disclosure and claims include specific rules for implementing the outcome of secure mobile checkouts and that render information into a specific format that is then used and applied to create the desired results of a secure mobile checkout, as set forth in *McRO, Inc. v. Bandai Namco Games America Inc.* (Fed. Cir. case number 15-1080, Sep. 13, 2016). In other words, the outcome of a secure mobile checkouts can be performed by many different types of rules and combinations of rules, and this disclosure includes various embodiments with specific rules. While the absence of complete preemption may not guarantee that a claim is eligible, the disclosure does not sufficiently preempt the field of secure mobile checkouts at all. The disclosure acts to narrow, confine, and otherwise tie down the disclosure so as not to cover the general abstract idea of just a secure mobile checkout. Significantly, other systems and methods exist for secure mobile checkouts, so it would be inappropriate to assert that the claimed invention preempts the field or monopolizes the basic tools of secure mobile checkouts. In other words, the disclosure will not prevent others from initiating secure mobile checkouts in a merchant store, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility,* 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   determining that a device has entered a merchant location based at least in part on receiving a merchant identifier for the merchant location;
   receiving a product identifier associated with a product that a user has selected from the merchant location and a user transaction account identifier, wherein the product identifier is based on an image of the product captured by a camera, wherein the image of the product comprises at least one of a universal product code (UPC), a quick response (QR) code, or a barcode;
   retrieving product data based at least in part on the merchant identifier, the product identifier, and a user profile of the device, wherein the product data comprises a product price;
   generating a transaction data packet associated with a user-initiated transaction to purchase the product, wherein the transaction data packet comprises the merchant identifier, the product price, and the user transaction account identifier;

transmitting, over a computer network, the transaction data packet to a payment network to retrieve a transaction authorization of the user-initiated transaction; and transmitting, in response to the transaction authorization, an exit signal to deactivate a security system at the merchant location by transmitting the exit signal to the security system, wherein the security system comprises at least one of an electromagnetic or magnetic strip, a radio frequency identification (RFID) security tag, a near field communication (NFC) security tag, a security label, a resonator tag, or a smart security chip.

2. The method of claim 1, wherein the retrieved product data further comprises a second product price corresponding to the product and wherein the second price corresponds to a second merchant identifier.

3. The method of claim 1, wherein the retrieved product data further comprises at least one of a personalized product offer based on geolocation data, a product manufacture rebate, a merchant rebate, or a transaction account issuer rebate.

4. The method of claim 1, further comprising:
applying an image recognition algorithm to the image to identify one or more dimensions of the product to identify the product identifier.

5. A system, comprising:
a memory; and
at least one processor coupled to the memory and configured to:
determine that a device has entered a merchant location based at least in part on receiving a merchant identifier for the merchant location;
receive a product identifier associated with a product that a user has selected from the merchant location and a user transaction account identifier, wherein the product identifier is based on an image of the product captured by a camera, wherein the image of the product comprises at least one of a universal product code (UPC), a quick response (QR) code, or a barcode;
retrieve product data based at least in part on the merchant identifier, the product identifier, and a user profile of the device, wherein the product data comprises a product price;
generate a transaction data packet associated with a user-initiated transaction to purchase the product, wherein the transaction data packet comprises the merchant identifier, the product price, and the user transaction account identifier;
transmit, over a computer network, the transaction data packet to a payment network to retrieve a transaction authorization of the user-initiated transaction; and
transmit, in response to the transaction authorization, an exit signal to deactivate a security system at the merchant location by transmitting the exit signal to the security system, wherein the security system comprises at least one of an electromagnetic or magnetic strip, a radio frequency identification (RFID) security tag, a near field communication (NFC) security tag, a security label, a resonator tag, or a smart security chip.

6. The system of claim 5, wherein the retrieved product data further comprises a second product price corresponding to the product and wherein the second price corresponds to a second merchant identifier.

7. The system of claim 5, wherein the retrieved product data further comprises at least one of a personalized product offer based on geolocation data, a product manufacture rebate, a merchant rebate, or a transaction account issuer rebate.

8. The system of claim 5, wherein the at least one processor is further configured to:
apply an image recognition algorithm to the image to identify one or more dimensions of the product to identify the product identifier.

9. A non-transitory computer-readable device having instructions stored thereon that, when executed by at least one computing device, cause the at least one computing device to perform operations comprising:
determining that a user device has entered a merchant location based at least in part on receiving a merchant identifier for the merchant location;
receiving a product identifier associated with a product that a user has selected from the merchant location and a user transaction account identifier, wherein the product identifier is based on an image of the product captured by a camera, wherein the image of the product comprises at least one of a universal product code (UPC), a quick response (QR) code, or a barcode;
retrieving product data based at least in part on the merchant identifier, the product identifier, and a user profile of the user device, wherein the product data comprises a product price;
generating a transaction data packet associated with a user-initiated transaction to purchase the product, wherein the transaction data packet comprises the merchant identifier, the product price, and the user transaction account identifier;
transmitting, over a computer network, the transaction data packet to a payment network to retrieve a transaction authorization of the user-initiated transaction; and
transmitting, in response to the transaction authorization, an exit signal to deactivate a security system at the merchant location by transmitting the exit signal to the security system, wherein the security system comprises at least one of an electromagnetic or magnetic strip, a radio frequency identification (RFID) security tag, a near field communication (NFC) security tag, a security label, a resonator tag, or a smart security chip.

10. The non-transitory computer-readable device of claim 9, wherein the retrieved product data further comprises a second product price corresponding to the product and wherein the second product price corresponds to a second merchant identifier.

11. The non-transitory computer-readable device of claim 9, wherein the retrieved product data further comprises at least one of a personalized product offer based on geolocation data, a product manufacture rebate, a merchant rebate, or a transaction account issuer rebate.

12. The non-transitory computer-readable device of claim 9, wherein the at least one computing device is further configured to perform operations comprising:
applying an image recognition algorithm to the image to identify one or more dimensions of the product to identify the product identifier.

* * * * *